(12) United States Patent
Schmidt

(10) Patent No.: US 6,782,465 B1
(45) Date of Patent: Aug. 24, 2004

(54) LINKED LIST DMA DESCRIPTOR ARCHITECTURE

(75) Inventor: Andreas Schmidt, Santa Clara, CA (US)

(73) Assignee: Infineon Technologies North America Corporation, San Jose, CA (US)

( * ) Notice: Subject to any disclaimer, the term of this patent is extended or adjusted under 35 U.S.C. 154(b) by 0 days.

(21) Appl. No.: 09/421,745

(22) Filed: Oct. 20, 1999

(51) Int. Cl.[7] .............................................. G06F 12/00
(52) U.S. Cl. ........................... 711/208; 710/22; 710/33; 711/154
(58) Field of Search ................................ 711/208, 213, 711/154, 169; 710/22, 24, 27, 33

(56) References Cited

U.S. PATENT DOCUMENTS

| 5,155,830 | A | | 10/1992 | Kurashige ..................... 710/24 |
| 5,606,665 | A | * | 2/1997 | Yang et al. ................... 711/154 |
| 5,644,784 | A | | 7/1997 | Peek ........................... 710/24 |
| 5,713,044 | A | | 1/1998 | Gillespie et al. .............. 710/22 |
| 5,954,794 | A | * | 9/1999 | Fishler et al. ................ 709/213 |
| 5,974,480 | A | | 10/1999 | Qureshi et al. ............... 710/27 |
| 6,070,194 | A | * | 5/2000 | Yu et al. ...................... 710/28 |
| 6,145,015 | A | * | 11/2000 | Iwasaki et al. ................ 710/1 |
| 6,185,633 | B1 | * | 2/2001 | Johnson ....................... 710/22 |
| 6,199,121 | B1 | * | 3/2001 | Olson et al. .................. 710/24 |
| 6,219,736 | B1 | * | 4/2001 | Klingman .................... 710/100 |
| 6,324,597 | B2 | * | 11/2001 | Collier ........................ 711/213 |

FOREIGN PATENT DOCUMENTS

| DE | 010048072 A1 | * | 4/2001 | ........... G06F/13/28 |
| EP | 0 333 594 A2 | | 9/1989 | |
| EP | 0 378 423 A2 | | 7/1990 | |
| EP | 0 732 659 | | 9/1996 | |
| WO | WO 01/29656 A2 | * | 4/2001 | ............. G06F/9/00 |

OTHER PUBLICATIONS

Promoters of the 1394 HCI: "1397-4 Open Host Controller Interface Specification," Release 1.00, Oct. 20, 1997 Copyright 1996, 1997; pp. ii–xiv; 1–170.*
"DMA Controller Unit," Intel Processor Developers Manual, last modified Mar. 26, 1999, section 19, pp. 19-1–19-5.

* cited by examiner

Primary Examiner—Pierre-Michel Bataille
(74) Attorney, Agent, or Firm—Fish & Richardson P.C.

(57) ABSTRACT

A linked list DMA descriptor includes an indication of a number of data pointers contained in a subsequent DMA descriptor. The number of data pointers contained in the subsequent DMA descriptor is preferably contained in the memory address of the subsequent DMA descriptor. The number of data pointers is stored by the DMA controller and controls how many read cycles are performed when processing the subsequent DMA descriptor.

13 Claims, 2 Drawing Sheets

US 6,782,465 B1

LINKED LIST DMA DESCRIPTOR ARCHITECTURE

FIELD OF THE INVENTION

The present invention relates generally to computer systems and direct memory access controllers in particular.

BACKGROUND OF THE INVENTION

In the early days of computers, data was moved in and out of memory by a central processing unit (CPU). However, as data transfer rates for mass storage devices such as hard drives or CD-ROMs increased, the CPU was too slow to handle the transfer of data and its use prevented the CPU from performing other tasks. As a result, most computers now incorporate direct memory access controllers (DMAs) to move data to and from a memory. A DMA operates by taking control of an address and data bus to either read data from or write data to a memory. To move data, a CPU gives the DMA controller an address of a DMA descriptor. The descriptor is a set of data that includes some predefined information including the size of a data block to be moved as well as a pointer with the address of the data block in memory.

In the past, each descriptor contained only one or exactly two data pointers. Each time the DMA controller was to move a data block, a new descriptor had to be read, thereby reducing the rate at which data could be moved. To speed data transfer rates, there is a need for a method of reducing the number of descriptors a DMA controller must read to move data.

SUMMARY OF THE INVENTION

To increase the rate at which data can be transferred by a DMA controller, a descriptor includes an address of a subsequent descriptor as well as an indication of a variable number of data pointers contained within the subsequent descriptor. The number of pointers in the subsequent descriptor is stored in the DMA controller. Upon reading a subsequent descriptor, the stored number of pointers controls a number of read cycles performed by the DMA controller.

In a presently preferred embodiment of the invention, the descriptors are stored in an aligned 32-bit memory. The last two address bits of the descriptor address are not needed and are therefore used to store the number of pointers in the next descriptor.

A DMA controller in accordance with the present invention includes a counter that stores a number of data pointers in a subsequent descriptor. Upon reading the descriptor, the counter controls a number of read cycles performed by the DMA controller when operating on the next descriptor.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The present invention is a method for increasing the rate of memory transfers performed by a direct memory access (DMA) controller by including an indication of a variable number of data pointers included in a subsequent descriptor.

Figure 1:
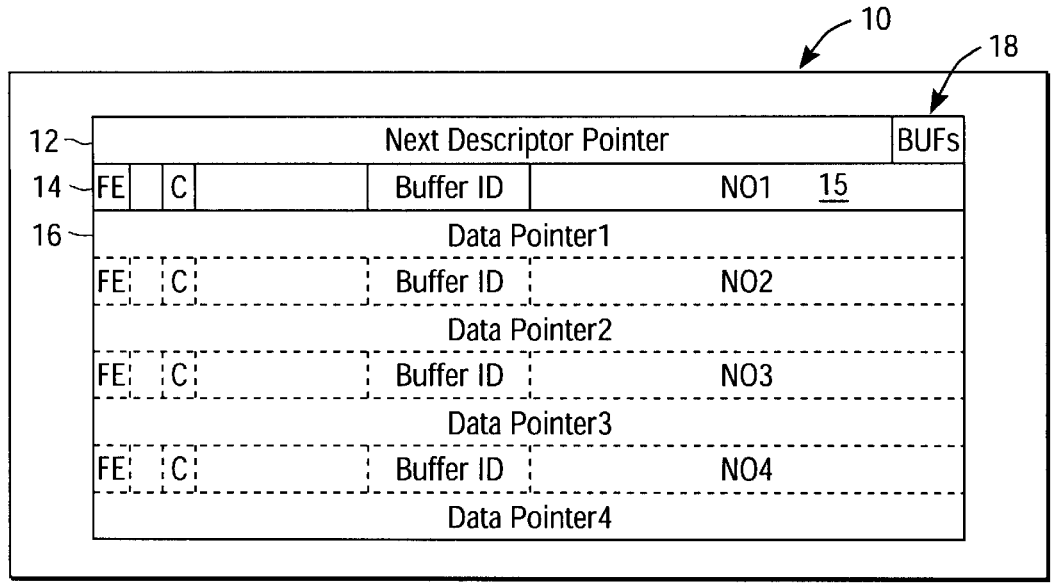
FIG. 1 illustrates a link list DMA descriptor in accordance with the present invention.

FIG. 1 illustrates a linked list DMA descriptor 10 in accordance with an embodiment of the present invention. In the presently preferred embodiment of the invention, the descriptor is stored in memory as a series of 32-bit words. The first word 12 of the descriptor 10 contains the address of a next descriptor to be read by the DMA controller. A second word 14 contains conventional data required by the DMA controller to move the data, including a pair of bytes 15 that store the size of a data block to be moved. The third word 16 of the descriptor 10 includes a 32-bit address of the data block to be moved.

Unlike the prior art wherein the description included a pointer to one or exactly two data blocks, the descriptor 10 may include up to four data pointers to data blocks which are to be moved by the DMA controller. Because the descriptor 10 is stored as a series of 32-bit words in an aligned memory, the last two bits of the 32-bit address of the next descriptor are always 00. Therefore, these last two bits 18 are preferably used to store the number of data pointers contained in a subsequent descriptor. If the descriptor is the last descriptor in a list of descriptors, the next descriptor pointer will be set to some predefined value that can be recognized by the DMA controller, such as the null character (i.e., all zeros) or some other readily recognizable code.

Figure 2:
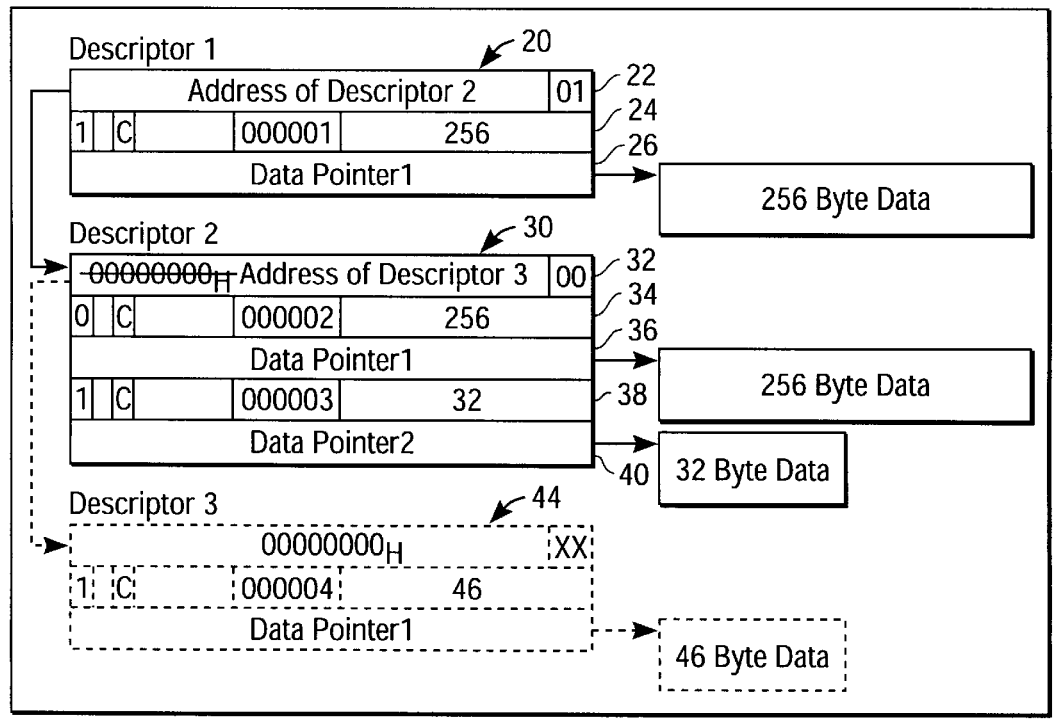
FIG. 2 illustrates how each DMA descriptor includes an indication of a number of data pointers stored in a subsequent descriptor.

FIG. 2 illustrates a link list of DMA descriptors in accordance with an embodiment of the present invention. A first descriptor 20 has stored as its first 32-bit word 22, the address of a second DMA descriptor 30. As indicated above, the last two bits of the 32-bit word 22 store the number of data pointers contained within the second DMA descriptor 30. In the example shown, the last two bits of the word 22 contain the value 01, thereby indicating that the subsequent DMA descriptor 30 contains two data pointers. The second 32-bit word 24 of the first DMA descriptor 20 contains some standard information required by the DMA controller as well as an indication of the size of the data block to be moved. In the example shown, the last two bytes of the 32-bit word 24 indicate that the data block to be moved has 256 bytes. The third 32-bit word 26 of the first descriptor 20 contains a pointer to the 256 byte data block to be moved.

The first 32-bit word 32 of the second DMA descriptor 30 originally has the null character stored as the address of a subsequent descriptor, thereby indicating that the second DMA descriptor 30 is the last descriptor in the list. The second DMA descriptor 30 includes two data pointers that reference two data blocks to be moved. A pair of 32-bit words 34 and 36 store the length (i.e., 256 bytes) of a first data block and its address while a second pair of 32-bit words 38 and 40 reference a second 32 byte data block and its address.

To add a subsequent DMA descriptor to the link list of descriptors, the address of the next descriptor is stored in the first 32-bit word 32 of the previous DMA descriptor 30. In the example shown, the null character stored as the first 32-bit word 32 is overwritten with the address of a subsequent DMA descriptor 44. Again, the last two bits of the address contain the number of data pointers within the subsequent DMA descriptor 44. In the example shown, the last two bits are 00, indicating that the subsequent DMA descriptor 44 contains only one data pointer.

The link list formed by the DMA descriptors 20, 30 and 44 can be updated independently of the operation of a DMA controller. As will be appreciated by those skilled in the art, the DMA controller contains a next descriptor address register in which the address of the next descriptor is stored by the CPU. In order to add a DMA descriptor to a linked list of DMA descriptors, the next address space of the last DMA descriptor in the list is updated to reflect the address of the new descriptor. In addition, the next descriptor address register within the DMA controller is updated to reflect the address of the new descriptor. As indicated above, the last two bits of the next DMA descriptor address contain the number of data pointers contained in the new DMA descriptor being added to the list.

When adding a new DMA descriptor to a list, there are three possible states of the DMA controller. First, it is possible that the DMA controller has not yet begun operating on the last descriptor in the list of descriptors. Therefore, if the next DMA descriptor address field for the last descriptor in the list is modified before the DMA controller begins operating on the previously last descriptor, it will recognize that the next address is not null and knows to process another DMA descriptor. In addition to updating the next descriptor address field of the previously last descriptor, a CPU also writes the address of the new DMA descriptor into the next descriptor address register of the DMA controller. Therefore, if the DMA controller has already read the next address field of the last descriptor (which was set at null), the DMA controller will still detect the new descriptor by reading its next descriptor address register after handling all the data pointers contained in the last descriptor processed. Finally, if the DMA controller is finished handling the data pointers contained in the previously last descriptor, it will enter a stopped state until the address of the new DMA descriptor and the number of data pointers included in the descriptor are written into the next descriptor address register of the DMA controller.

Figure 3:
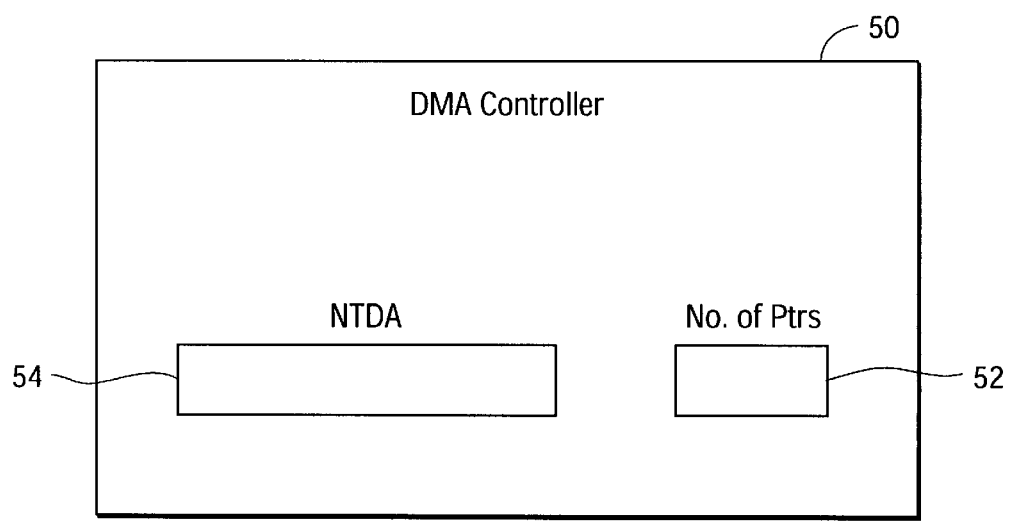
FIG. 3 illustrates how a DMA controller in accordance with the present invention includes a counter to store a number of data pointers included in a subsequent descriptor.

FIG. 3 illustrates a block diagram illustrating the additional functionality that is added to a DMA controller according to one embodiment of the present invention. The DMA controller 50 is constructed in the same manner of conventional DMA controllers except that the DMA controller 50 contains a counter 52 that stores the number of pointers in a subsequent DMA descriptor as determined from the last two bits of the next descriptor address. The number of pointers stored in the counter 52 controls the number of read cycles performed by the DMA controller when processing the next DMA descriptor. That is, upon processing the next DMA descriptor referenced in the next descriptor address register 54, the DMA controller causes a number of words to be read from memory, wherein the number of words is dependent upon the number of pointers stored in the counter 52. For example, if the information stored for each data pointer requires two words of data and the register 50 indicates that there are two data pointers in a subsequent DMA descriptor, then the DMA controller will cause five words of data to be read from memory; one word for the address of the next DMA descriptor and two words for each of the two data pointers contained in the next DMA descriptor.

As can be seen from the above, the present invention is a method for reducing overhead associated with DMA controllers. Although the preferred embodiment of the invention uses the previously unused bits of the next descriptor address field to store a reference to a variable number of pointers, it will be appreciated that the reference could be placed at other locations in the descriptor. However, using the previously unused bits of the next DMA descriptor address is preferred because only a single write cycle is required to the DMA in order to supply the DMA with the next address and the number of pointers.

The embodiments of the invention in which an exclusive property or privilege is claimed are defined as follows:

1. A direct memory access (DMA) controller of the type that moves data into and out of memory in a computer system, comprising:
   a next descriptor address register for storing an address of a next DMA descriptor to be processed by the DMA controller, the next DMA descriptor including a variable number of data pointers each pointing to a memory block; and
   a counter of a DMA descriptor that stores a number indicative of the number of data pointers in the next DMA descriptor, the counter controlling a number of memory read cycles performed by the DMA controller when the next DMA descriptor is processed.

2. A data structure tangibly stored in a memory for facilitating a direct memory access (DMA) controller to move a plurality of memory blocks, comprising:
   a plurality of DMA descriptors tangibly stored in the memory such that each DMA descriptor has an address and is stored in a memory location at the address thereof, wherein each DMA descriptor describes one or more of the plurality of memory blocks, and each DMA descriptor includes a subsequent address field for storing the address of another DMA descriptor, one or more data pointers each pointing to one of the plurality of memory blocks, and a data-pointer counting field for counting the number of data pointers in another DMA descriptor; and
   wherein the plurality of DMA descriptors forms a link list, a given DMA descriptor in the link list is linked with a next DMA descriptor in the link list by storing in the subsequent address field of the given DMA descriptor the address of the next DMA descriptor and specifying with the data-pointer counting field of the given descriptor the number of the data pointers in the next DMA descriptor.

3. The data structure of claim 2, wherein unused bits of the subsequent address field are used as the data-pointer counting field of the given descriptor for specifying the number of the data pointers in the next DMA descriptor.

4. A computer-readable memory device for storing a current DMA descriptor for facilitating a direct memory access (DMA) controller to move a plurality of memory blocks, the computer-readable memory device comprising:
   a number of computer readable bits that indicate a memory address of a subsequent DMA descriptor;
   a number of computer-readable bits that store one or more data pointers in the current DMA descriptor, each data pointer pointing to one of the plurality of memory blocks; and
   a number of computer-readable bits of the current DMA descriptor that indicate the number of data pointers in the subsequent DMA descriptor for determining a number of read cycles that the DMA controller performs.

5. The computer-readable memory device of claim 4, wherein the number of bits that indicate the number of data pointers in the subsequent DMA descriptor are included in the memory address of the subsequent DMA descriptor.

6. A method of moving a plurality of memory blocks with a direct memory access (DMA) controller, comprising:

providing a DMA controller with an address of a DMA descriptor that indicates a block of memory to be moved by the DMA controller, the DMA descriptor including an address of a subsequent DMA descriptor that includes a variable number of data pointers each pointing to one of the plurality of the memory blocks and an indication specifying the number of data pointers included in the subsequent DMA descriptor; and reading the address of the subsequent DMA descriptor and performing a number DMA read cycles that is dependent on the number of data pointers specified by the indication.

7. A method of moving memory blocks with a direct memory access (DMA) controller, comprising:

providing a DMA controller with an address of a DMA descriptor that indicates a block of memory to be moved by the DMA controller, the DMA descriptor including an address of a subsequent DMA descriptor and an indication of a variable number of data pointers included in the subsequent DMA descriptor;

reading the address of the subsequent DMA descriptor and performing a number DMA read cycles that is dependent on the number of data pointers indicated; and wherein the indication of the number of data pointers in the subsequent DMA descriptor is provided by: encoding the number of data pointers into unused bits of the subsequent DMA descriptor's address.

8. A method of moving a plurality of memory blocks with a direct memory access (DMA) controller, comprising:

storing a plurality of DMA descriptors in a memory such that each DMA descriptor has an address and is stored in a memory location at the address thereof, wherein each DMA descriptor describes one or more of the plurality of memory blocks, and each DMA descriptor includes a subsequent address field for storing the address of another DMA descriptor, one or more data pointers each pointing to one of the plurality of memory blocks, and a data-pointer counting field for counting the number of data pointers in another DMA descriptor;

generating a link list having a plurality of nodes, each node being one of the plurality of DMA descriptors, the generating step including linking a given DMA descriptor with a next DMA descriptor by storing in the subsequent address field of the given DMA descriptor the address of the next DMA descriptor and specifying with the data-pointer counting field of the given descriptor the number of the data pointers in the next DMA descriptor;

causing the DMA controller to receive an address of a first DMA descriptor in the link list;

causing the DMA controller to read the subsequent address field, the data pointers, and the data-pointer counting field in the first DMA descriptor; and moving each memory block pointed by one of the data pointers in the first DMA descriptor.

9. The method of claim 8, further comprising:

causing the DMA controller to receive an address of a second DMA descriptor in the link list, the address of the second DMA descriptor being read from the subsequent address field in the first DMA descriptor;

causing the DMA controller to read the subsequent address field, the data pointers, and the data-pointer counting field in the second DMA descriptor; and moving each memory block pointed by one of the data pointers in the second DMA descriptor.

10. The method of claim 8, wherein the generating step including using unused bits of the subsequent address field as the data-pointer counting field of the given descriptor for specifying the number of the data pointers in the next DMA descriptor.

11. A method of moving N memory blocks with a direct memory access (DMA) controller, N being an integer that is at least one, the method comprising:

storing M descriptors in a memory such that each descriptor has an address and is stored in a memory location at the address thereof, M being an integer that is at least one and at most N, wherein each descriptor describes one or more of the N memory blocks, and each descriptor includes subsequent address field for storing the address of another descriptor, one or more data pointers each pointing to one of the N memory blocks, and a data-pointer counting field;

generating a link list having M nodes each being one of the M descriptors, the link list linking the M descriptors sequentially by linking a J'th descriptor with a J+1'th descriptor by storing the address of the J+1'th descriptor in the subsequent address field of the J'th descriptor, and J being an integer that is at least one and at most M−1;

causing the DMA controller to receive an address of a K'th descriptor in the link list, and K being an integer that is at least one and at most M−1;

causing the DMA controller to read the subsequent address field, the data pointers, and the data-pointer counting field in the K'th descriptor;

moving each memory block pointed by one of the data pointers in the K'th descriptor; and causing the DMA controller to receive an address of the K+1'th descriptor in the link list, the address of the K+1'th descriptor being read from the subsequent address field in the K'th descriptor.

12. The method of claim 11, wherein the generating step including using the data-pointer counting field in the K'th descriptor to specify the number of the data pointers in the K+1'th descriptor.

13. The method of claim 12, further comprising:

using unused bits of the subsequent address field in the K'th descriptor as the data-pointer counting field in the K'th descriptor to specify the number of the data pointers in the K+1'th descriptor.

* * * * *